United States Patent
Yang et al.

(10) Patent No.: US 12,387,285 B2
(45) Date of Patent: Aug. 12, 2025

(54) OBJECT DETECTION METHOD AND DEVICE

(71) Applicant: BEIJING JINGDONG QIANSHI TECHNOLOGY CO., LTD., Beijing (CN)

(72) Inventors: Lei Yang, Beijing (CN); Kai Wu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 18/004,307

(22) PCT Filed: Apr. 8, 2021

(86) PCT No.: PCT/CN2021/085890
§ 371 (c)(1),
(2) Date: Jan. 5, 2023

(87) PCT Pub. No.: WO2022/007451
PCT Pub. Date: Jan. 13, 2022

(65) Prior Publication Data
US 2023/0222618 A1 Jul. 13, 2023

(30) Foreign Application Priority Data
Jul. 6, 2020 (CN) .......................... 202010641217.6

(51) Int. Cl.
*G06T 1/00* (2006.01)
*G06T 1/20* (2006.01)
(Continued)

(52) U.S. Cl.
CPC .............. *G06T 1/0007* (2013.01); *G06T 1/20* (2013.01); *G06T 1/60* (2013.01); *G06T 7/70* (2017.01);
(Continued)

(58) Field of Classification Search
CPC ........... G06T 1/0007; G06T 1/20; G06T 1/60; G06T 7/70; G06T 2207/10028;
(Continued)

(56) References Cited

U.S. PATENT DOCUMENTS

2017/0213093 A1 7/2017 Li et al.
2020/0174107 A1 6/2020 Briggs et al.
(Continued)

FOREIGN PATENT DOCUMENTS

CN 107025642 A 8/2017
CN 110264468 A 9/2019
(Continued)

OTHER PUBLICATIONS

1st Office Action dated Jul. 22, 2023 of Chinese Application No. 202010641217.6.
(Continued)

*Primary Examiner* — Shahbaz Nazrul
(74) *Attorney, Agent, or Firm* — Qinghong Xu

(57) ABSTRACT

An object detection method is provided. In the method, raw point cloud data including a to-be-detected object is obtained, where the raw point cloud data includes annotation information for the to-be-detected object; instance point cloud data corresponding to the to-be-detected object is extracted from the raw point cloud data by using the annotation information; an object position point is determined from the raw point cloud data, and the raw point cloud data and the instance point cloud data to obtain a fused to-be-detected sample is fused based on the object position point and the to-be-detected object is detected by using the raw point cloud data and the to-be-detected sample.

20 Claims, 4 Drawing Sheets

(51) Int. Cl.
 *G06T 1/60* (2006.01)
 *G06T 7/70* (2017.01)
 *G06V 10/46* (2022.01)

(52) U.S. Cl.
 CPC .... *G06V 10/46* (2022.01); *G06T 2207/10028* (2013.01); *G06T 2207/30196* (2013.01)

(58) Field of Classification Search
 CPC . G06T 2207/30196; G06T 2207/30252; G06T 7/73; G06T 2207/20081; G06V 10/46; G06V 10/255; G06V 10/26; G06V 10/778; G06V 10/803; G06V 20/58; G06V 20/64; G06V 2201/07; G06F 18/214; G06F 18/25
 See application file for complete search history.

(56) References Cited

U.S. PATENT DOCUMENTS

| | | | |
|---|---|---|---|
| 2020/0258400 A1* | 8/2020 | Yuan | G08G 5/0034 |
| 2020/0301015 A1* | 9/2020 | Siddiqui | G01S 17/86 |
| 2021/0150720 A1* | 5/2021 | Kumar | G01S 17/89 |
| 2023/0260255 A1* | 8/2023 | Tan | G06N 3/0464 |
| | | | 382/100 |

FOREIGN PATENT DOCUMENTS

| | | |
|---|---|---|
| CN | 110728210 A | 1/2020 |
| CN | 111241969 A | 6/2020 |
| CN | 111784774 A | 10/2020 |

OTHER PUBLICATIONS

International Search Report dated Jul. 7, 2021 for PCT International Application No. PCT/CN2021/085890.

Jian Wu et al., Ground-Aware Point Cloud Semantic Segmentation for Autonomous Driving, Proceedings of the 28th ACM Joint Meeting on European Software Engineering Conference and Symposium on the Foundations of Software Engineering, Published on Oct. 15, 2019, p. 971-979.

Jason Ku et al., Monocular 3D Object Detection Leveraging Accurate Proposals and Shape Reconstruction, 2019 IEEE/CVF Conference on Computer Vision and Pattern Recognition(CVPR), Published on Jun. 15, 2019, p. 11859-11868.

Kaihong Huang et al., Accurate Direct Visual-Laser Odometry with Explicit Occlusion Handling and Plane Detection, 2019 International Conference on Robotics and Automation(ICRA), Published on May 20, 2019, p. 1295-1301.

Extended European Search Report dated Apr. 22, 2024 for European Application No. 21838542.5.

* cited by examiner

OBJECT DETECTION METHOD AND DEVICE

CROSS-REFERENCE TO RELATED APPLICATIONS

The present application is a U.S. National Stage of International Application No. PCT/CN2021/085890 filed on Apr. 8, 2021, which claims the priority to Chinese Patent Application No. 202010641217.6, titled "Object Detection Method and Device, Computer-readable Medium and Electronic Apparatus" filed on Jul. 6, 2020, the entire contents thereof are incorporated herein by reference.

TECHNICAL FIELD

The present disclosure relates to the technical field of image processing, in particular to an object detection method and device, computer-readable medium and electronic apparatus.

BACKGROUND

Object detection is important in computer perspective and digital image processing, and is widely used in robot navigation, intelligent video surveillance, autonomous driving and many other fields.

In practical engineering, there are problems such difficult annotation and high annotation cost in point cloud data, resulting in limited datasets available. However, the object detection relies heavily on annotation data, and the size of the annotation data directly affects the final performance of a model, so that it is an effective way to improve the detection accuracy of the model by augmenting a given training data set in a data enhancement way. There are two main types of data enhancement. One type is to generate enhancement data based on structured data, and the other type is to generate enhancement data based on point cloud data in database. The first type removes static objects from the scene and then adds dynamic objects to obtain the training data set, which is a complex process and difficult to achieve online data enhancement. The second type first extracts annotation frames (including the point cloud inside the frame) from the training data set, randomly selects some annotation frames from the extracted annotation frames and adds them to the point cloud data of the current frame to obtain the enhanced training data set. Although the second type is relatively simple, the random placement of annotation frames leads to a lack of validity in the generated training dataset, which is less effective in improving the detection accuracy.

It should be noted that the information disclosed in the background technology section above is intended only to enhance the understanding of the context of the present disclosure and may therefore include information that does not constitute the prior art known to those skilled in the art.

SUMMARY

The present disclosure is to provide an object detection method and device, computer-readable medium and electronic apparatus.

An aspect of the present disclosure provides an object detection method, including: obtaining raw point cloud data including a to-be-detected object, wherein the raw point cloud data includes annotation information for the to-be-detected object; extracting, from the raw point cloud data, instance point cloud data corresponding to the to-be-detected object by using the annotation information; determining an object position point from the raw point cloud data, and fusing, based on the object position point, the raw point cloud data and the instance point cloud data to obtain a fused to-be-detected sample; and detecting the to-be-detected object by using the raw point cloud data and the to-be-detected sample.

The present disclosure further discloses an object detection device, including: a raw data obtaining module, configured to obtain raw point cloud data including a to-be-detected object, wherein the raw point cloud data includes annotation information for the to-be-detected object; an instance data obtaining module, configured to extract, from the raw point cloud data, instance point cloud data corresponding to the to-be-detected object by using the annotation information; a fusing module, configured to determine an object position point from the raw point cloud data, and fuse, based on the object position point, the raw point cloud data and the instance point cloud data to obtain a fused to-be-detected sample; and an object detecting module, configured to detect the to-be-detected object by using the raw point cloud data and the to-be-detected sample.

The present disclosure further discloses an electronic apparatus including one or more processors; and a memory, storing an executable instruction that, when being executed by the one or more processors, causes the electronic apparatus to execute the steps of: obtaining raw point cloud data including a to-be-detected object, wherein the raw point cloud data includes annotation information for the to-be-detected object; extracting, from the raw point cloud data, instance point cloud data corresponding to the to-be-detected object by using the annotation information; determining an object position point from the raw point cloud data, and fusing, based on the object position point, the raw point cloud data and the instance point cloud data to obtain a fused to-be-detected sample; and detecting the to-be-detected object by using the raw point cloud data and the to-be-detected sample.

The present disclosure further discloses a computer-readable medium having a computer program stored thereon that, when being executed by a processor, causes the processor to execute the steps of: obtaining raw point cloud data including a to-be-detected object, wherein the raw point cloud data includes annotation information for the to-be-detected object; extracting, from the raw point cloud data, instance point cloud data corresponding to the to-be-detected object by using the annotation information; determining an object position point from the raw point cloud data, and fusing, based on the object position point, the raw point cloud data and the instance point cloud data to obtain a fused to-be-detected sample; and detecting the to-be-detected object by using the raw point cloud data and the to-be-detected sample.

It should be understood that the above general description and the detailed descriptions below are exemplary and explanatory only and do not limit the present disclosure.

BRIEF DESCRIPTION OF THE DRAWINGS

The accompanying drawings herein, which are incorporated into and form a part of the specification, illustrate embodiments consistent with the present application, and serves together with the specification to explain the principle of the present disclosure. Obviously, the accompanying drawings in the following description are only some embodiments of the present application, and other accompanying drawings may be obtained by those skilled in the art from these accompanying drawings without creative work. In the accompanying drawings.

DETAILED DESCRIPTION

In order to make the above object, feature and advantage of the present disclosure more apparent and understandable, the present disclosure is described in further detail below in conjunction with the accompanying drawings and specific embodiments.

Figure 1:
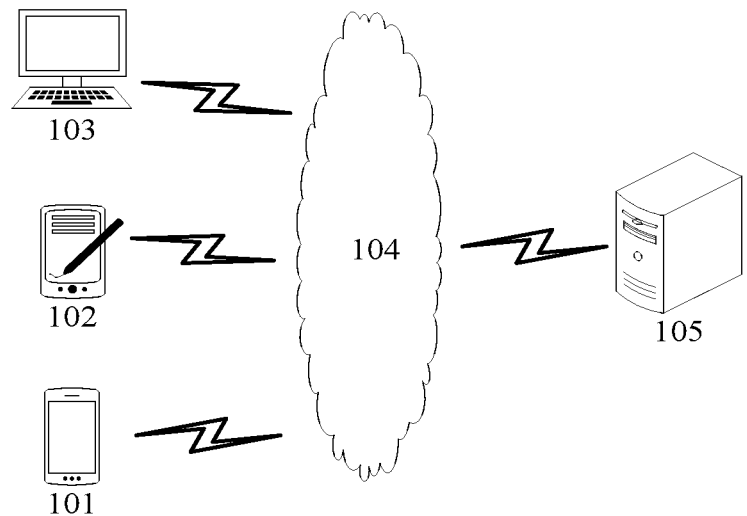
FIG. 1 schematically illustrates a diagram of a system architecture for implementing an object detection method according to an embodiment of the present disclosure.

First, an example embodiment of the present disclosure provides a system architecture for implementing an object detection method. Referring to FIG. 1, the system architecture 100 may include terminal devices 101, 102, 103, a network 104 and a server 105. The network 104 is used to provide a medium for a communication link between the terminal devices 101, 102, 103 and the server 105. The network 104 may include various types of connections, such as wired or wireless communication links, fiber optic cables or the like.

A user may use the terminal devices 101, 102, 103 to interact with the server 105 via the network 104 to receive or send request instructions. The terminal devices 101, 102, 103 may have various communication client applications installed thereon, such as shopping applications, web browser applications, search applications, instant messengers, email client applications, social platform software and the like.

The terminal devices 101, 102, 103 may be various electronic apparatus that have a display and support web browsing, including but not limited to smartphones, tablets, laptops, desktop computers and the like.

The server 105 may be a server that provides various services, such as a background administration server that supports shopping websites viewed by users using the terminal devices 101, 102, 103 (for example only). The background management server may process, for example, analyze the received data such as product information inquiry requests and feed the processing result (e.g., object push information, product information, which is an example only) to the terminal device.

It shall be noted that the object detection method provided by the embodiment of the present disclosure is generally performed by the server 105, and accordingly, the object detection device is generally provided in the server 105. However, it can be understood by those skilled in the art that the object detection method of the present disclosure may also be performed by the terminal device 101, and accordingly, the object detection device may be provided in the terminal device 101, which is not limited in the embodiment of the present disclosure.

Figure 2:
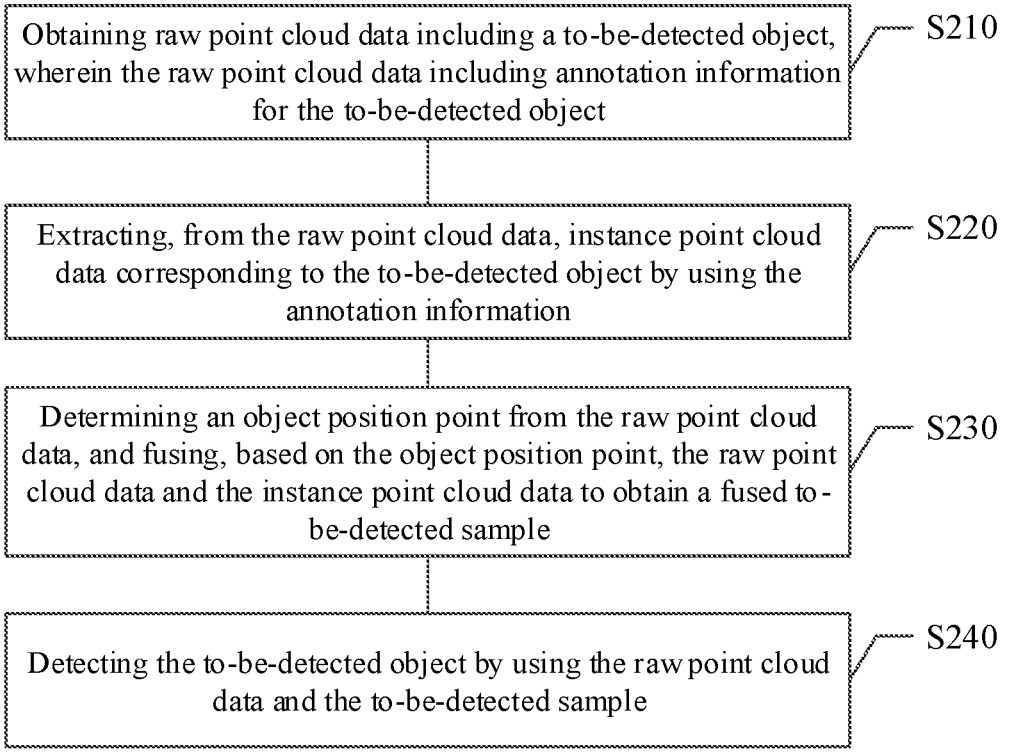
FIG. 2 schematically illustrates a flowchart of an object detection method according to an embodiment of the present disclosure.

Based on the above system architecture, an embodiment of the present disclosure provides an object detection method. Referring to FIG. 2, the object detection method may include:

step S210, obtaining raw point cloud data including a to-be-detected object, wherein the raw point cloud data includes annotation information for the to-be-detected object;

step S220, extracting, from the raw point cloud data, instance point cloud data corresponding to the to-be-detected object by using the annotation information;

step S230, determining an object position point from the raw point cloud data, and fusing, based on the object position point, the raw point cloud data and the instance point cloud data to obtain a fused to-be-detected sample; and step S240, detecting the to-be-detected object by using the raw point cloud data and the to-be-detected sample.

In the object detection method provided in an example embodiment of the present disclosure, on the one hand, the to-be-detected sample may be obtained by fusing the instance point cloud data and the raw point cloud data, thereby greatly increasing the number of samples on the basis of the raw point cloud data, which can reduce the annotation cost, shorten the annotation period and thus improve the detection efficiency. On another hand, the data fusing process may be controlled by using the object position point to avoid random fusion that leads to a lack of validity of the sample, which may improve the effectiveness of the to-be-detected sample and thus enhance the accuracy of the object detection. On yet another hand, the object is detected by using the raw point cloud data and the to-be-detected sample, which can improve the accuracy of the object detection on the basis of increasing the sample size.

In the following, the above steps in the example embodiment are described in more detail.

In step S210, raw point cloud data including a to-be-detected object is obtained, wherein the raw point cloud data includes annotation information for the to-be-detected object.

In an embodiment, the to-be-detected object may include various objects in the scene, such as buildings, movable vehicles, people and the like; and may also include other objects, such as roads, rivers and the like, however the embodiment is not limited thereto. The scene may be scanned by a 3D laser scanner to obtain the raw point cloud data corresponding to the scene, or the camera may also be used to obtain the raw point cloud data of the scene. The point cloud data may include a large number of point cloud samples, where the point cloud is a collection of points on the surface of an object. The to-be-detected object in the raw point cloud data may be annotated to obtain the raw point cloud data including the annotation information of the to-be-detected object, for example, by adding an annotation frame to mark the to-be-detected object in the point cloud data, so as to obtain the raw point cloud data including the annotation information.

In step S220, instance point cloud data corresponding to the to-be-detected object is extracted from the raw point cloud data by using the annotation information.

The instance point cloud data is the point cloud corresponding to the to-be-detected object in the raw point cloud data, and the instance point cloud data may also include the annotation information of the to-be-detected object, i.e., the annotation may be copied simultaneously when extracting the instance point cloud data. In an embodiment, the annotation information may be used to obtain the instance point cloud data from the raw point cloud data. Each point cloud sample in the raw point cloud data may include a plurality of to-be-detected objects, that is, include a plurality of annotation information pieces. For example, if the raw point cloud data is the point cloud data of a city road and the to-be-detected object is a vehicle, the point cloud sample obtained by each scanning may include a plurality of point clouds of the vehicle. By reading the annotation information one by one, the instance point cloud corresponding to the to-be-detected object in the raw point cloud data may be extracted, thereby obtaining a large number of instance point cloud data, which facilitates data enhancement.

In step S230, an object position point is determined from the raw point cloud data, and the raw point cloud data and the instance point cloud data is fused based on the object position point to obtain a fused to-be-detected sample.

Figure 3:
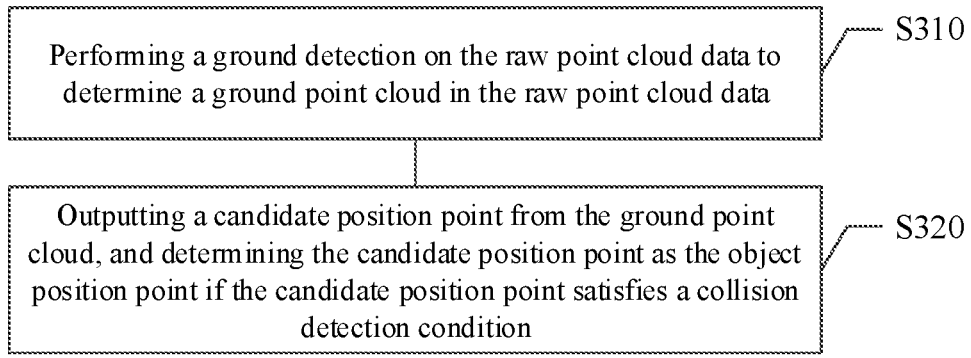
FIG. 3 schematically illustrates a flowchart of an object detection method according to another embodiment of the present disclosure.

For example, the object position point may be a point belonging to the ground in the raw point cloud data. The method for determining the object position point from the raw point cloud data may include the following steps S310 and step S320, as shown in FIG. 3.

In step S310, a ground detection is performed on the raw point cloud data to determine a ground point cloud in the raw point cloud data. For example, n points near the ground are first taken, where the point with the smallest z-value may be the point near the ground. Then the n points with the smallest z-value are taken and their covariance matrix is calculated. The singular value decomposition may be performed on the calculated covariance matrix to obtain eigenvalues and eigenvectors, where the eigenvector corresponding to the smallest eigenvalue is the normal vector of the ground plane, so that the ground point cloud belonging to the ground plane may be obtained. In addition, other algorithms may also be used to perform the ground detection on the raw point cloud data to obtain the ground point cloud, for example, a filtering condition is determined based on the characteristics of the ground point cloud to filter the ground point cloud from the raw point cloud data and the like.

In step S320, a candidate position point is outputted from the ground point cloud, and the candidate position point is determined as the object position point if the candidate position point satisfies a collision detection condition. For example, if the instance point cloud data is positioned at the candidate position point and does not collide with an object other than the ground point cloud in the raw point cloud data, the candidate position point satisfies the collision detection condition. Specifically, first a position point may be outputted randomly from the ground point cloud to be used as the candidate position point, or a position point nearest to the to-be-detected object point cloud in the ground point cloud may be found as the candidate position point. After the candidate position point is outputted, if the instance point cloud data is fused to the candidate position point of the raw point cloud, and the instance point cloud data does not collide with any object other than the ground in the raw point cloud data, the candidate position point may be determined as the object position point. If the instance point cloud data is placed at the candidate position point of the raw point cloud data, and the instance point cloud data collides with other objects in the raw point cloud data, the candidate position point is discarded and another candidate position point is selected from the ground point cloud for determination until a candidate position point satisfying the collision detection conditions is found.

After the object position point is obtained, the instance point cloud data may be fused into the object position of the raw point cloud data to obtain the to-be-detected sample. The number of samples may be proportionally increased by fusing the raw point cloud with the instance point cloud, thus obtaining a large number of samples including annotations, which can effectively improve the output index of an object detection model and increase the detection accuracy. The instance point cloud corresponding to the to-be-detected object is randomly put into the ground of the raw point cloud data, so that the fused to-be-detected object conforms to the real situation and the to-be-detected sample obtained has a higher validity.

In an example embodiment, translation transformation is performed on the instance point cloud data according to the object position point to fuse the instance point cloud data and the raw point cloud data to obtain fused point cloud data. For example, the instance point cloud data may be positioned at the position of the coordinate origin, and the instance point cloud data is transformed to the object position point by the translation transformation, thereby updating the coordinates of the instance point cloud data and the coordinates corresponding to the annotation information in the instance point cloud data. After the translation transformation, the instance point cloud data and the raw point cloud data may be added and thus fused into the same frame. The fused point cloud may be used as the to-be-detected sample, and the to-be-detected sample may be used as a training sample for a model to train an object detection model. If the instance point cloud data is not at the coordinate origin, the instance point cloud data may be normalized so that the original coordinates thereof are transformed to the position of the coordinate origin for translational transformation. In addition, in other embodiments of the present disclosure, the raw point cloud may be fused with the instance point cloud in other ways, such as flipping, scaling and the like, all of which are within the scope of protection of the present disclosure.

Figure 4:
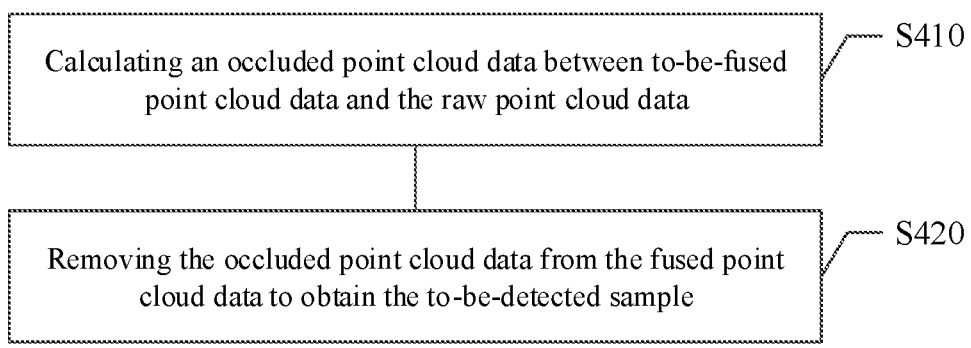
FIG. 4 schematically illustrates a flowchart of an object detection method according to an embodiment of the present disclosure.

In an example embodiment, after fusing the instance point cloud data into the raw point cloud data, the following steps S410 and S420 may be included, as shown in FIG. 4.

In step S410, an occluded point cloud data between to-be-fused point cloud data and the raw point cloud data is calculated.

Figure 5:
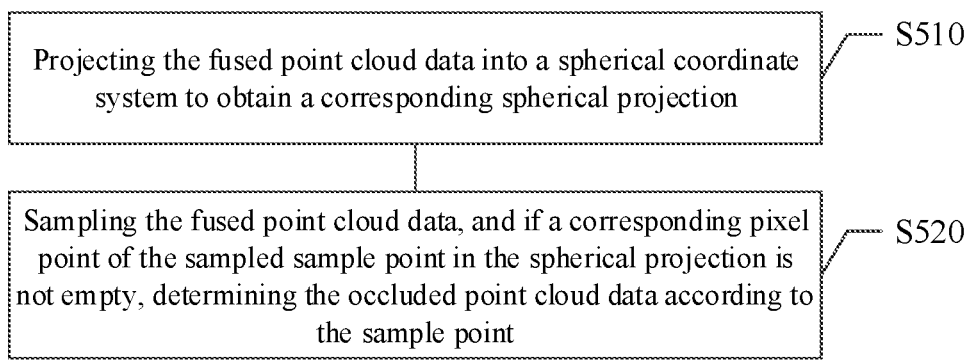
FIG. 5 schematically illustrates a flowchart of an object detection method according to another embodiment of the present disclosure.

When a scene is scanned to obtain a point cloud, there is an occlusion between the scanned point and an object, and the object relatively close to the scanned point may occlude the object far from the scanned point. In an embodiment, the occluded point cloud data may include an occluded point cloud. To calculate the occluded point cloud data, the point cloud data may be converted into a spherical coordinate system. Specifically, the method of calculating the occluded point cloud data may include the following steps S510 and S520, as shown in FIG. 5.

In step S510, the fused point cloud data is projected into a spherical coordinate system to obtain a corresponding spherical projection. The fused point cloud data is first subjected to a coordinate transformation from a Cartesian coordinate system to a spherical coordinate system, and then the spherical projection of the fused point cloud data may be obtained.

In step S520, the fused point cloud data is sampled to obtain a sample point, and the occluded point cloud data is determined by determining whether a corresponding pixel point of the sampled sample point in the spherical projection is empty or not. Since the pixel point in the spherical projection is the point cloud closest to the origin of the spherical coordinate system, if a point in the fused point cloud is in the same position as a pixel point in the spherical projection, i.e., if there is a corresponding pixel point for that point in the fused point cloud, there is a possibility of occlusion at that point. Specifically, the fused point cloud data is sampled to obtain one point at each time, the pixel point in the spherical projection corresponding to that point is determined, whether the pixel point is empty or not is determined, if the pixel point is not empty, it may determine that there is another point with the same orientation as that point, and if the pixel point is empty, it may determine that the point is an occluded point.

For example, if the pixel corresponding to the sampled sample point is not empty, a first distance between the sample point and the origin of the spherical coordinate system may be calculated, a second distance between the pixel point corresponding to the sample point and the origin may be obtained from the spherical projection, it determines whether the first distance is greater than the second distance, and if the first distance is greater than the second distance, the sample point may be determined as the occluded point cloud data. Then a next sample point in the fused point cloud data may be traversed, and so on, and all the sample points in the fused point cloud may be traversed to determine all the occluded point cloud data.

In step S420, the occluded point cloud data is removed from the fused point cloud data to obtain the to-be-detected sample. The occluded point cloud data may include coordinate information of a plurality of occluded point clouds, and with the occluded point cloud data, the occluded point cloud may be removed from the fused point cloud data to obtain the to-be-detected sample. The spherical projection in step S410 allows for the removal of the occluded point cloud data. Specifically, in step S410, if it is determined that for a sample point, the first distance is not greater than the second distance, the pixel point corresponding to the sample point may be updated to update, in the spherical projection, the distance between the pixel point and the origin to the first distance. After the updating of the spherical projection is completed, the distance of each pixel point in the spherical projection is the distance of the nearest point cloud to the origin, i.e., the pixel points in the spherical projection are all un-occluded point clouds, thus by using the spherical projection to perform inverse transformation, the point cloud may be transformed into a point cloud in a Cartesian coordinate system, so that a point cloud that does not include occluded point cloud data may be obtained as the to-be-detected sample.

In step S240, the to-be-detected object is detected by using the raw point cloud data and the to-be-detected sample.

The to-be-detected sample is a sample set obtained after data enhancement, the raw point cloud data is a point cloud sample set of a real scene obtained by scanning the scene, and the samples in the sample set include annotations, which may be used as a training set for the model to train the object detection model to obtain a trained object detection model, which may then be used to detect the to-be-detected object.

In an example embodiment, by taking an automatic driving scene as an example, if the to-be-detected object is a vehicle, a certain amount of raw point cloud data may first be obtained through a laser radar, a camera and other tools, the raw point cloud data may be annotated, and the vehicle contained therein may be marked out with an annotation frame. Then the raw point cloud data including the annotation frame may be extracted to extract therefrom the corresponding point cloud of the vehicle and the annotation frame, and thus the instance point cloud data is obtained. The instance point cloud data corresponding to the vehicle and the raw point cloud data may be fused to obtain a certain number of to-be-detected samples, so that the data enhancement processing of the samples is completed. Then both the to-be-detected sample after the enhancement process and the raw point cloud data are used as the training sample set, which greatly increases the number of samples, so that when a deep learning algorithm is used to train the object detection model, the output index such as the accuracy of the model may be improved. The object detection model may be used to detect movable vehicles in a scene in a device using automatic driving technology.

Figure 6:
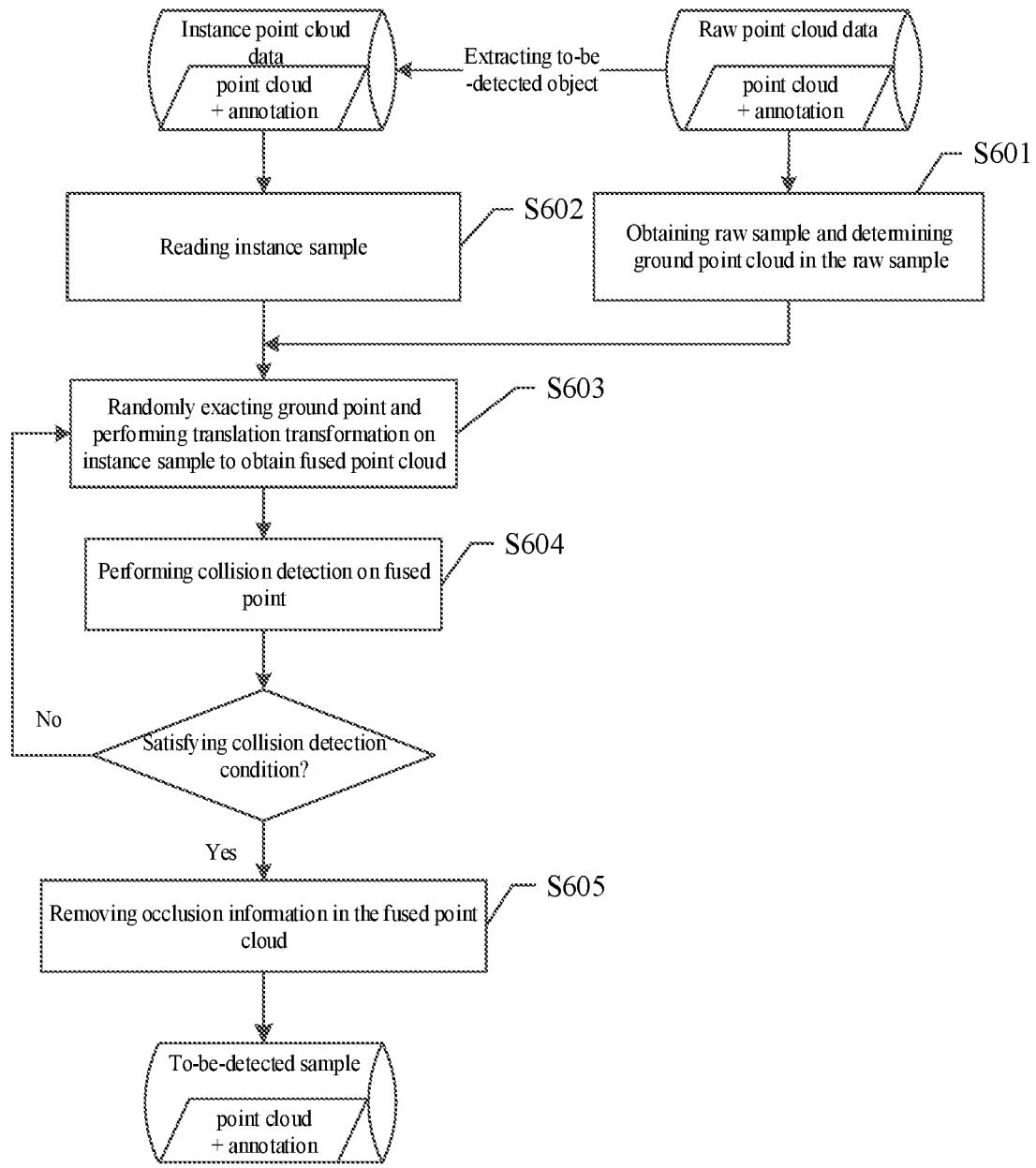
FIG. 6 schematically illustrates a flowchart of an object detection method according to an embodiment of the present disclosure.

In an example embodiment, the method may include steps S601 to S605, as shown in FIG. 6.

In step S601, a sample is read from the raw point cloud data as a raw sample, and a ground detection is performed on the raw sample to determine a ground point cloud in the raw sample, where each sample in the raw point cloud data may include a point cloud of the to-be-detected object and annotation information of the point cloud. In step S602, an instance sample is read randomly from instance point cloud data. In step S603, a ground point is randomly selected to perform translation transformation on the instance sample to obtain a fused point cloud. In step S604, a collision detection is performed on the fused point cloud, whether a collision detection condition is satisfied is determined, and if it is satisfied, step S605 is performed. In step S605, occlusion information in the fused point cloud is removed, coordinate transformation is performed on the fused point cloud, and the spherical projection overlapping points are filtered out to obtain the to-be-detected sample, where the spherical projection overlapping point is the point cloud where the projected pixel points are in the same position in the spherical projection. If the collision detection condition is not satisfied, step S603 is performed, and a ground point is randomly selected again to perform translation transformation on the instance sample until the fused point cloud satisfying the collision detection condition is obtained. The to-be-detected sample obtained finally includes the fused to-be-detected object and the annotation information for the to-be-detected object, and the model may be trained using the to-be-detected sample and the raw sample in the raw point cloud data.

It should be noted that steps S601 to S605 in FIG. 6 are described in the above specific embodiments and are not repeated here.

Further, an example embodiment further provides an object detection device for performing the object detection method described above in the present disclosure. The device may be applied to a server or terminal device.

Figure 7:
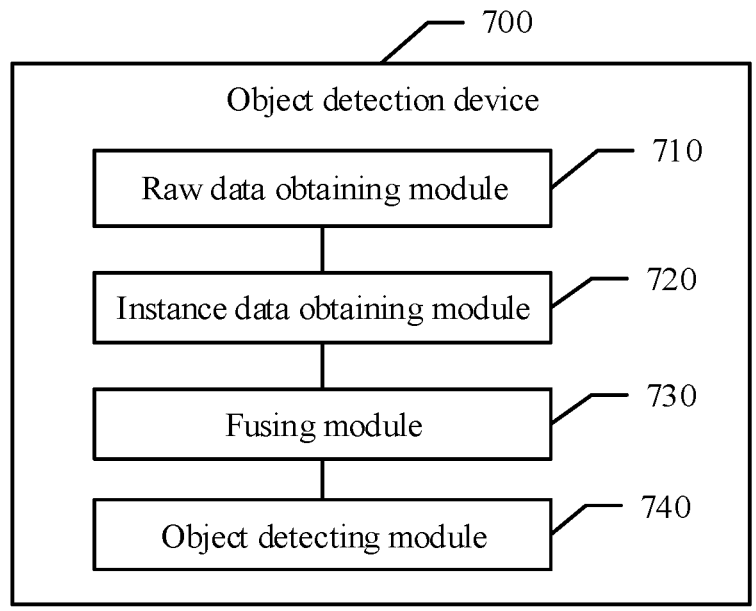
FIG. 7 schematically illustrates a block diagram of an object detection device according to an embodiment of the present disclosure.

Referring to FIG. 7, the object detection device 700 may include:
    a raw data obtaining module 710, configured to obtain raw point cloud data including a to-be-detected object, wherein the raw point cloud data includes annotation information for the to-be-detected object;

an instance data obtaining module 720, configured to extract, from the raw point cloud data, instance point cloud data corresponding to the to-be-detected object by using the annotation information;

a fusing module 730, configured to determine an object position point from the raw point cloud data, and fuse, based on the object position point, the raw point cloud data and the instance point cloud data to obtain a fused to-be-detected sample; and an object detecting module 740, configured to detect the to-be-detected object by using the raw point cloud data and the to-be-detected sample.

In an example embodiment of the present disclosure, the fusing module 730 may be specifically configured to: perform translation transformation on the instance point cloud data according to the object position point to obtain fused point cloud data as the to-be-detected sample.

In an example embodiment of the present disclosure, the fusing module 730 may specifically include:

a ground detection unit, configured to perform a ground detection on the raw point cloud data to determine a ground point cloud in the raw point cloud data; and a position outputting unit, configured to output a candidate position point from the ground point cloud, and determine the candidate position point as the object position point if the candidate position point satisfies a collision detection condition.

In an example embodiment of the present disclosure, the position outputting unit is specifically configured to: determine that the random position satisfies the collision detection condition if the instance point cloud data is positioned at the random position and does not collide with an object other than the ground point cloud in the raw point cloud data.

In an example embodiment of the present disclosure, the object detection device further includes:

an occlusion calculating module, configured to calculate an occluded point cloud data between the to-be-fused point cloud data and the raw point cloud data; and an occlusion removing module, configured to remove the occluded point cloud data from the fused point cloud data to obtain the to-be-detected sample.

In an example embodiment of the present disclosure, the occlusion calculating module specifically includes:

a coordinate transforming unit, configured to project the fused point cloud data into a spherical coordinate system to obtain a corresponding spherical projection; and an occlusion determining unit, configured to sample the fused point cloud data, and if a corresponding pixel point of the sampled sample point in the spherical projection is not empty, determine occlusion information according to the sample point.

In an example embodiment of the present disclosure, the occlusion determining unit is specifically configured to: obtain a first distance of the sample point from an origin of the spherical coordinate system and a second distance of the corresponding pixel point of the sample point in the spherical projection from the origin of the spherical coordinate system; and determine the sample point as the occluded cloud data if the first distance is greater than the second distance.

Since the various functional modules of the object detection device of the example embodiment of the present disclosure correspond to the steps of the example embodiment of the object detection method described above, details not disclosed in the device embodiment of the present disclosure may refer to the embodiment of the object detection method of the present disclosure described above.

Figure 8:
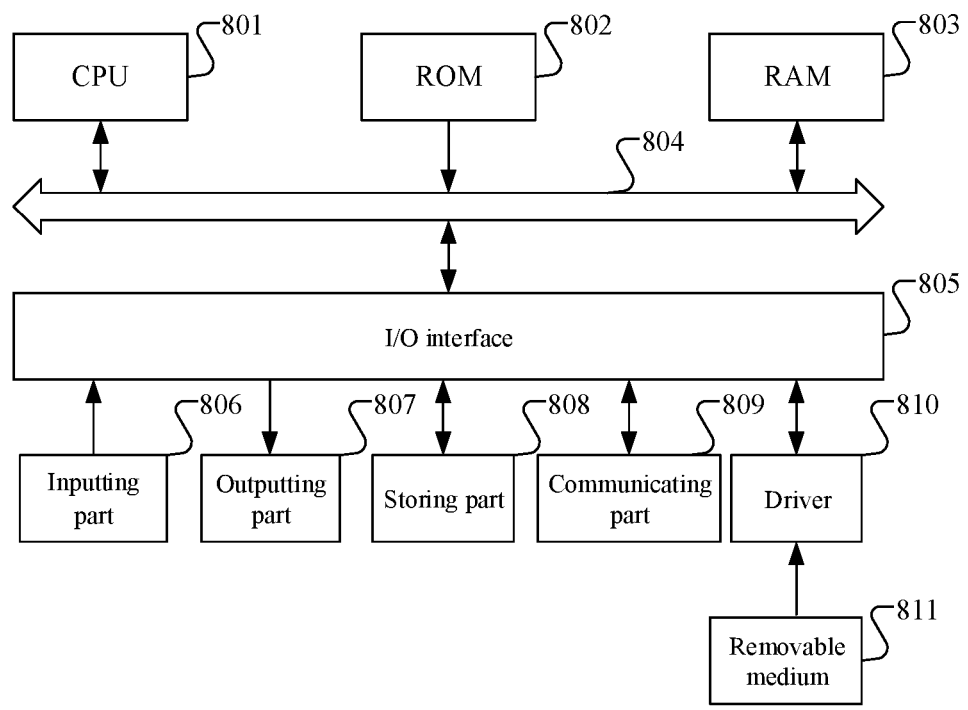
FIG. 8 illustrates a schematic structure diagram of a computer system suitable for implementing an electronic apparatus according to an embodiment of the present disclosure.

FIG. 8 illustrates a schematic structure diagram of a computer system suitable for implementing an electronic apparatus of an embodiment of the present disclosure.

It should be noted that the computer system 800 of the electronic apparatus illustrated in FIG. 8 is only an example, which does not impose any limitations on the functionality and scope of use of embodiments of the present disclosure.

As shown in FIG. 8, the computer system 800 includes a central processing unit (CPU) 801 which may perform various appropriate actions and processes based on a program stored in a read-only memory (ROM) 802 or loaded into a random access memory (RAM) 803 from a storing part 808. In RAM 803, various programs and data required for system operation are also stored. The CPU 801, ROM 802 and RAM 803 are connected to each other via bus 804. The input/output (I/O) interface 805 is also connected to the bus 804.

The following components are connected to the I/O interface 805: an inputting part 806 including keyboard, mouse and the like; an outputting part 807 including, for example, cathode ray tube (CRT), liquid crystal display (LCD), speaker and the like; a storing part 808 including a hard disk and the like; and a communicating part 809 including a network interface card such as a LAN card, modem and the like. The communicating part 809 performs communication processing via a network such as the Internet. The driver 810 is also connected to the I/O interface 805 as required. A removable media 811 such as magnetic disk, optical disk, magnetooptical disk, semiconductor memory and the like are mounted on the driver 810 as required to allow computer programs read therefrom to be installed into the storing part 808 as required.

In particular, according to an embodiment of the present disclosure, the process described below with reference to the flowchart may be implemented as a computer software program. For example, an embodiment of the present disclosure includes a computer program product including a computer program carried on a computer readable medium, the computer program includes program codes for performing the method illustrated in the flowchart. In such an embodiment, the computer program may be downloaded and installed from a network via a communicating part 809, and/or installed from the removable medium 811. When the computer program is executed by the central processing unit (CPU) 801, various functions as defined in the method and apparatus of the present disclosure are performed.

It is noted that the computer readable medium shown in the present disclosure may be a computer readable signal medium or a computer readable storage medium or any combination thereof. The computer readable storage medium may be but is not limited to for example an electrical, magnetic, optical, electromagnetic, infrared, or semiconductor system, device or element, or any combination thereof. More specific examples of computer-readable storage media may include but are not limited to electrical connection having one or more wires, portable computer magnetic disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present disclosure, a computer readable storage medium may be any tangible medium that contains or stores a program that may be used by or in combination with an instruction execution system, device, or element. In the present disclosure, a computer-readable signaling medium may include a data signal propagated in the baseband or as part of a carrier wave carrying computer-readable program codes. Such propagated data signal may take a variety of forms including but not limited to electromagnetic signals, optical signals, or any suitable combination thereof. The computer-readable signal medium may also be any computer-readable medium other than a computer-readable storage medium that sends, propagates or transmits a program for use by or in conjunction with an instruction execution system, device or element. The program code contained on the computer readable medium may be transmitted using any suitable medium, including but not limited to: wireless, wire, fiber optic cable, RF or any suitable combination thereof.

The flowcharts and block diagrams in the accompanying drawings illustrate possible implementations of the architecture, functionality and operation of systems, methods and computer program products in accordance with various embodiments of the present disclosure. In this regard, each block in a flowchart or block diagram may represent a module, program segment, or portion of code, which contains one or more executable instructions for implementing a specified logical function. It should also be noted that in some alternative implementations, the functions indicated in the blocks may also occur in a different order than that indicated in the accompanying drawings. For example, two blocks represented one after the other may actually be executed in substantial parallel, and sometimes may be executed in an opposite order, depending on the function involved. It is also noted that each block in the block diagram or flowchart and the combination of blocks in the block diagram or flowchart may be implemented using a dedicated hardware-based system that performs a specified function or operation, or may be implemented using a combination of dedicated hardware and computer instructions.

The unit described in embodiments of the present disclosure may be implemented by means of software, or by means of hardware, and the unit described may also be provided in a processor. The names of these units do not, in some cases, constitute a limitation of the unit itself.

As a further aspect, the present disclosure also provides a computer readable medium which may be contained in the electronic apparatus described in the above described embodiments, or may also be provided separately and not assembled into that electronic apparatus. The computer readable medium carries one or more programs which, when being executed by an electronic apparatus, cause the electronic device to implement a method as described in the above embodiments. For example, the electronic apparatus may implement the various steps as shown in FIGS. 2 to 6.

It should be noted that although in the detailed description above, a number of modules or units of the apparatus for action execution are mentioned, such division is not mandatory. In fact, according to an embodiment of the present disclosure, features and functions of two or more modules or units described above may be specified in a single module or unit. Conversely, the feature and function of one module or unit described above may be further divided to be specified by a plurality of modules or units.

Those skilled in the art can easily conceive of other embodiments of the present disclosure upon consideration of the specification and practice of the invention disclosed herein. The present disclosure is intended to cover any variations, uses or adaptations of the present disclosure that follow the general principle of the present disclosure and include commonly known or customary technical means in the art that are not disclosed herein. The description and embodiments are to be regarded as exemplary only, and the present disclosure is not limited to the precise construction already described above and illustrated in the accompanying drawings, and may be modified and altered in various ways without departing from the scope thereof. The true scope and spirit of the present disclosure is indicated by the following claims.

What is claimed is:

1. An object detection method, comprising:
    obtaining raw point cloud data comprising a to-be-detected object, wherein the to-be-detected object is annotated in the raw point cloud data so that the raw point cloud data comprises annotation information of the to-be-detected object;
    extracting, from the raw point cloud data, instance point cloud data corresponding to the to-be-detected object by using the annotation information, wherein the instance point cloud data is data of a point cloud corresponding to the to-be-detected object in the raw point cloud data;
    determining an object position point from the raw point cloud data, and fusing the instance point cloud data into the object position point of the raw point cloud data to obtain a fused to-be-detected sample, wherein the object position point is a point in a ground point cloud of the raw point cloud data; and
    detecting the to-be-detected object by using the raw point cloud data and the to-be-detected sample.

2. The method according to claim 1, wherein the fusing the instance point cloud data into the object position point of the raw point cloud data comprises:
    performing translation transformation on the instance point cloud data according to the object position point to obtain fused point cloud data as the to-be-detected sample.

3. The method according to claim 1, wherein the determining the object position point from the raw point cloud data comprises:
    performing a ground detection on the raw point cloud data to determine a ground point cloud in the raw point cloud data; and
    outputting a candidate position point from the ground point cloud, and determining the candidate position point as the object position point when the candidate position point satisfies a collision detection condition.

4. The method according to claim 3, wherein when the instance point cloud data is positioned at the candidate position point and does not collide with an object other than the ground point cloud in the raw point cloud data, the candidate position point satisfies the collision detection condition.

5. The method according to claim 2, further comprising, after obtaining the fused point cloud data:
    calculating an occluded point cloud data between to-be-fused point cloud data and the raw point cloud data; and
    removing the occluded point cloud data from the fused point cloud data to obtain the to-be-detected sample.

6. The method according to claim 5, wherein the calculating the occluded point cloud data between the fused point cloud data and the raw point cloud data comprises:
    projecting the fused point cloud data into a spherical coordinate system to obtain a corresponding spherical projection; and
    sampling the fused point cloud data, and when a corresponding pixel point of the sampled sample point in the spherical projection is not empty, determining the occluded point cloud data according to the sample point.

7. The method according to claim 6, wherein the determining the occluded point cloud data according to the sample point comprises:
obtaining a first distance of the sample point from an origin of the spherical coordinate system and a second distance of the corresponding pixel point of the sample point in the spherical projection from the origin of the spherical coordinate system; and
determining the sample point as the occluded point cloud data when the first distance is greater than the second distance.

8. An object detection device, comprising:
a processor; and
a memory for storing executable instructions that, when being executed by the processor, cause the processor to implement an object detection method comprising:
obtaining raw point cloud data comprising a to-be-detected object, wherein the to-be-detected object is annotated in the raw point cloud data so that the raw point cloud data comprises annotation information of the to-be-detected object;
extracting, from the raw point cloud data, instance point cloud data corresponding to the to-be-detected object by using the annotation information, wherein the instance point cloud data is data of a point cloud corresponding to the to-be-detected object in the raw point cloud data;
determining an object position point from the raw point cloud data, and fusing the instance point cloud data into the object position point of the raw point cloud data to obtain a fused to-be-detected sample, wherein the object position point is a point in a ground point cloud of the raw point cloud data; and
detecting the to-be-detected object by using the raw point cloud data and the to-be-detected sample.

9. The device according to claim 8, wherein the fusing the instance point cloud data into the object position point of the raw point cloud data comprises:
performing translation transformation on the instance point cloud data according to the object position point to obtain fused point cloud data as the to-be-detected sample.

10. The device according to claim 8, wherein the determining the object position point from the raw point cloud data comprises:
performing a ground detection on the raw point cloud data to determine a ground point cloud in the raw point cloud data; and
outputting a candidate position point from the ground point cloud, and determining the candidate position point as the object position point when the candidate position point satisfies a collision detection condition.

11. The device according to claim 10, wherein
when the instance point cloud data is positioned at the candidate position point and does not collide with an object other than the ground point cloud in the raw point cloud data, the candidate position point satisfies the collision detection condition.

12. The device according to claim 9, wherein the object detection method further comprises, after obtaining the fused point cloud data:
calculating an occluded point cloud data between to-be-fused point cloud data and the raw point cloud data; and removing the occluded point cloud data from the fused point cloud data to obtain the to-be-detected sample.

13. The device according to claim 12, wherein the calculating the occluded point cloud data between the fused point cloud data and the raw point cloud data comprises:
projecting the fused point cloud data into a spherical coordinate system to obtain a corresponding spherical projection; and
sampling the fused point cloud data, and when a corresponding pixel point of the sampled sample point in the spherical projection is not empty, determining the occluded point cloud data according to the sample point.

14. The device according to claim 13, wherein the determining the occluded point cloud data according to the sample point comprises:
obtaining a first distance of the sample point from an origin of the spherical coordinate system and a second distance of the corresponding pixel point of the sample point in the spherical projection from the origin of the spherical coordinate system; and
determining the sample point as the occluded point cloud data when the first distance is greater than the second distance.

15. A computer-readable non-volatile storage media having executable instructions stored thereon that, when being executed by a processor, cause the processor to implement an object detection method comprising:
obtaining raw point cloud data comprising a to-be-detected object, wherein the to-be-detected object is annotated in the raw point cloud data so that the raw point cloud data comprises annotation information of the to-be-detected object;
extracting, from the raw point cloud data, instance point cloud data corresponding to the to-be-detected object by using the annotation information, wherein the instance point cloud data is data of a point cloud corresponding to the to-be-detected object in the raw point cloud data;
determining an object position point from the raw point cloud data, and fusing the instance point cloud data into the object position point of the raw point cloud data to obtain a fused to-be-detected sample, wherein the object position point is a point in a ground point cloud of the raw point cloud data; and
detecting the to-be-detected object by using the raw point cloud data and the to-be-detected sample.

16. The storage media according to claim 15, wherein the fusing the instance point cloud data into the object position point of the raw point cloud data comprises:
performing translation transformation on the instance point cloud data according to the object position point to obtain fused point cloud data as the to-be-detected sample.

17. The storage media according to claim 15, wherein the determining the object position point from the raw point cloud data comprises:
performing a ground detection on the raw point cloud data to determine a ground point cloud in the raw point cloud data; and
outputting a candidate position point from the ground point cloud, and determining the candidate position point as the object position point when the candidate position point satisfies a collision detection condition.

18. The storage media according to claim 17, wherein
when the instance point cloud data is positioned at the candidate position point and does not collide with an object other than the ground point cloud in the raw point cloud data, the candidate position point satisfies the collision detection condition.

19. The storage media according to claim 16, wherein the object detection method further comprises, after obtaining the fused point cloud data:
calculating an occluded point cloud data between to-be-fused point cloud data and the raw point cloud data; and
removing the occluded point cloud data from the fused point cloud data to obtain the to-be-detected sample.

20. The storage media according to claim 19, wherein the calculating the occluded point cloud data between the fused point cloud data and the raw point cloud data comprises:
projecting the fused point cloud data into a spherical coordinate system to obtain a corresponding spherical projection; and
sampling the fused point cloud data, and when a corresponding pixel point of the sampled sample point in the spherical projection is not empty, determining the occluded point cloud data according to the sample point.

* * * * *